United States Patent
Song et al.

(10) Patent No.: US 7,664,357 B2
(45) Date of Patent: Feb. 16, 2010

(54) VERTICAL-TYPE PHOTONIC-CRYSTAL PLATE AND OPTICAL DEVICE ASSEMBLY

(75) Inventors: Hyun Woo Song, Daejeon (KR); Sang Choon Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 40 days.

(21) Appl. No.: 11/945,551

(22) Filed: Nov. 27, 2007

(65) Prior Publication Data
US 2008/0138015 A1 Jun. 12, 2008

(30) Foreign Application Priority Data
Dec. 7, 2006 (KR) .................. 10-2006-0123995
Sep. 11, 2007 (KR) .................. 10-2007-0092128

(51) Int. Cl.
G02B 6/26 (2006.01)
G02B 6/30 (2006.01)
G02B 6/122 (2006.01)

(52) U.S. Cl. ............................. 385/129; 385/39; 385/49

(58) Field of Classification Search .................. 385/39, 385/49, 129–132
See application file for complete search history.

(56) References Cited

U.S. PATENT DOCUMENTS

| 5,854,866 A | 12/1998 | Leonard |
| 6,468,823 B1 | 10/2002 | Scherer et al. |
| 6,917,744 B2 * | 7/2005 | Koyama .................. 385/131 |
| 2004/0165850 A1 | 8/2004 | Noda et al. |

FOREIGN PATENT DOCUMENTS

| JP | 2004-191408 A | 7/2004 |
| KR | 19990084770 | 12/1999 |
| KR | 1020040082301 A | 9/2004 |
| KR | 1020060123706 A | 12/2006 |

OTHER PUBLICATIONS

J.C. Knight, et al; "Large mode area photonic crystal fibre;" Electronic Letters Jun. 25, 1998, vol. 34, No. 13.
B.J. Mangan, et al; "Experimental study of dual-core photonic crystal fibre;" Electronic Letters Aug. 3, 2000, vol. 36, No. 16.
Fabrizio Fogli, et al; "Full vectorial BPM modeling of Index-Guiding Photonic Crystal Fibers and Couplers;" Jan. 14, 2002, vol. 10, No. 1, Optics Express 54.
J.C. Knight, et al; "All-silica single-mode optical fiber with photonic crystal cladding;" Oct. 1, 1996, vol. 21, No. 19, Optics Letters.

* cited by examiner

*Primary Examiner*—Kevin S Wood
(74) *Attorney, Agent, or Firm*—Ladas & Parry LLP (57) ABSTRACT

Provided are a photonic-crystal plate that forms an optical waveguide and an optical device assembly using the same, and more particularly, a vertical-type photonic-crystal plate and an optical device assembly configured to be easily integrated with surface-emitting light source devices and surface-receiving light detector devices. The photonic-crystal plate includes a plurality of cylindrical through holes formed in a thickness direction and arranged in a periodic crystal lattice structure. The plate further includes: a main crystal lattice defect that forms a main optical waveguide for passing lights in a direction perpendicular to the photonic-crystal plate; and a sub-crystal lattice defect that forms a sub-optical waveguide for causing light in a specific wavelength band among the lights passing through the main optical waveguide to be optically coupled and passing the coupled light in the direction perpendicular to the photonic-crystal plate.

16 Claims, 9 Drawing Sheets

Main waveguide   Sub waveguide

FIG. 9

VERTICAL-TYPE PHOTONIC-CRYSTAL PLATE AND OPTICAL DEVICE ASSEMBLY

CROSS-REFERENCE TO RELATED APPLICATION

This application claims priority to and the benefit of Korean Patent Application No. 2006-123995, filed Dec. 7, 2006, and No. 2007-92128, filed Sep. 11, 2007, the disclosure of which is incorporated herein by reference in its entirety.

BACKGROUND

1. Field of the Invention

The present invention relates to a photonic-crystal plate that forms an optical waveguide and an optical device assembly using the same, and more particularly, to a vertical-type photonic-crystal waveguide and an optical device assembly configured to be easily integrated with surface-emitting light source devices and surface-receiving light detector devices.

The present invention has been produced from the work supported by the IT R&D program of MIC (Ministry of Information and Communication)/IITA (Institute for Information Technology Advancement) [200-S-051-02, Photonic device integrated module for optical access network] in Korea.

2. Discussion of Related Art

As light sources applicable to optical communication, surface-emitting laser devices have attracted attention because of their advantages of easy high integration, low power consumption, and low cost. A light source and light detector combination module capable of transmitting a signal from one point to a distant point and receiving a signal from a distant point is increasingly required for optical communications. In optical communication, an optical add drop multiplexer (OADM) has attracted attention as a device for reading information from a selected specific wavelength of transmitted light and transmitting a specific wavelength carrying information through the waveguide.

Further, optical fiber devices with photonic crystal are being actively studied, and photonic crystal devices applied to a semiconductor substrate are being introduced [References 1, 2, 3, 4, 5 and 6]. Application of Optical fiber waveguides with photonic crystals to high-output fiber light sources is being attempted because of their very large space mode [References 1 and 6].

Optical couplers are being actively studied by applying multiple cores to a photonic crystal fiber [References 2 and 5]. As an optical communication device, a high-density OADM device obtained by applying a photonic crystal structure to a semiconductor substrate has been disclosed, and a very small integrated device has been obtained from a conventional OADM device [Reference 3]. Also, researchers are currently seeking to obtain a light source by applying a photonic crystal structure to a semiconductor substrate [Reference 4].

However, the above conventional optical devices with the photonic crystal do not comprise optical coupling devices associated with surface-emitting light sources and surface-receiving light detectors. Accordingly, use of conventional photonic crystal techniques does not provide high integration of a device in which a plurality of optical devices are integrated.

In particular, surface-emitting light source devices and surface-receiving light detector devices that can be mounted on a substrate with ease and with high integration do not have a structure adopting photonic crystal techniques so far.

SUMMARY OF THE INVENTION

The present invention is directed to an optical device assembly with a plurality of highly integrated optical devices, and a photonic-crystal plate used as a waveguide for the optical device assembly.

The present invention is particularly directed to an optical device assembly and a photonic-crystal plate in which both light-receiving devices and light-emitting devices can be arranged in a matrix for high density integration.

One aspect of the present invention provides a vertical-type optical waveguide in which a plate comprises photonic crystal holes formed in the vicinity of optical waveguides and with a relatively lower refractive index than a light-propagating core, so that light propagates through the core in a direction perpendicular to the plate.

Another aspect of the present invention provides a vertical-type optical coupler in which cores of the optical waveguides are placed closer to one another so that light is coupled to neighboring optical waveguides when propagating into one of the cores by a thickness of the core corresponding to a coupling length in a direction perpendicular to the plate.

Still another aspect of the present invention provides a photonic-crystal plate comprising a plurality of cylindrical through holes formed in a thickness direction and arranged in a periodic crystal lattice structure, the plate further comprising: a main crystal lattice defect that forms a main optical waveguide for passing lights in a direction perpendicular to the photonic-crystal plate; and a neighboring crystal lattice defect that forms a sub-optical waveguide for causing light in a specific wavelength band among the lights passing through the main optical waveguide to be optically coupled and passing the coupled light in the direction perpendicular to the photonic-crystal plate.

Yet another aspect of the present invention provides an optical waveguide device comprising: a photonic-crystal plate including a plurality of cylindrical through holes formed in a thickness direction and arranged in a periodic crystal lattice structure, and at least one crystal lattice defect; a light input unit for inputting light to the at least one crystal lattice defect in a direction perpendicular to the photonic-crystal plate; and a light output unit for collecting the light emitted from the at least one crystal lattice defect in a direction perpendicular to the photonic-crystal plate.

Still yet another aspect of the present invention provides an optical device assembly comprising: a photonic-crystal plate including a plurality of cylindrical through holes formed in a thickness direction and arranged in a periodic crystal lattice structure, and at least one crystal lattice defect for selectively processing light having a wavelength in a desired band; a light input unit for inputting light to the at least one crystal lattice defect in a direction perpendicular to the photonic-crystal plate; and a light output unit for collecting the light emitted from the at least one crystal lattice defect in a direction perpendicular to the photonic-crystal plate.

The light input unit may be implemented by an optical fiber having a section contiguous to the at least one crystal lattice defect or a light-emitting device for emitting light to the at least one crystal lattice defect. Also, the light output unit may be implemented by an optical fiber having a section contiguous to the at least one crystal lattice defect or a light-receiving device for receiving light from the at least one crystal lattice defect.

That is, optical devices or optical fibers may be applied to both surfaces (an upper surface and a lower surface) of the photonic lattice plate forming a vertical-type waveguide, thereby implementing various optical device assemblies. In exemplary embodiments that will be described below, optical devices are located on one surface of the most practical photonic-crystal plate and optical fibers are located on the other surfaces.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, preferred embodiments of the present invention will be described in detail with reference to the accompanying drawings. The embodiments of the present invention, however, may be changed into several other forms, and the scope of the present invention should not be construed as being limited to the following embodiments. The embodiments of the present invention are intended to more comprehensively explain the present invention to those skilled in the art. Accordingly, the shapes of elements or the like shown in figures are exaggerated to emphasize distinct explanation, and elements indicated by like reference numerals in the figures mean like elements. Further, when it is described that any layer is present 'on' another layer or a semiconductor substrate, it means that the layer may be present in direct contact with another layer or the semiconductor substrate, or alternatively, a third layer may be interposed therebetween.

Figure 1:
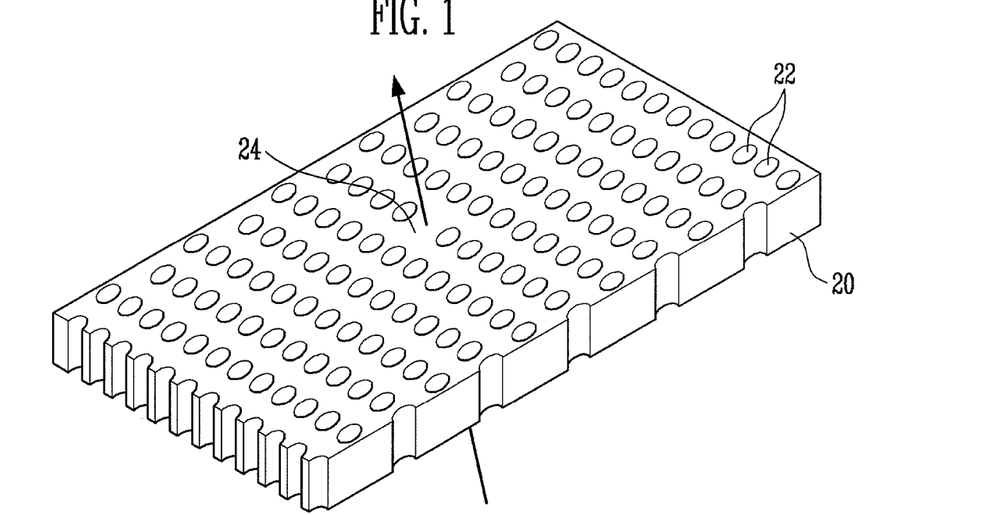
FIG. 1 is a perspective view illustrating a vertical-type photonic-crystal plate according to an exemplary embodiment of the present invention.

FIG. 1 illustrates a structure of a photonic-crystal plate according to the present invention. The photonic-crystal plate 20 includes cylindrical photonic crystal holes (i.e., cylindrical through holes) 22 formed around a light-propagating core to have a relatively smaller average refractive index than the core, causing light to propagate only through the core having a relatively greater refractive index.

The cylindrical through holes 22 may lack a material for forming the photonic-crystal plate. The cylindrical through holes 22 may be filled with a different optical material from the photonic-crystal plate material.

The substrate shown is called a photonic-crystal plate because of its lattice structure in which the cylindrical through holes 22 are formed in one direction and in a regular manner. An area where there is no cylindrical through hole, i.e., a lattice defect area 24 serves as a waveguide.

As a waveguide comprising such a photonic-crystal plate, a conventional waveguide is formed such that light propagates in a direction perpendicular to a passing-through direction of cylindrical through holes while the waveguide 24 according to the present invention is formed such that light propagates in a passing-through direction of the cylindrical through holes 22. Thus, in the present invention, incident light is input to one side of the photonic-crystal plate 20, propagated in a direction perpendicular to the photonic-crystal plate through the vertical-type optical waveguide, and output to the other side of the photonic-crystal plate.

FIGS. 2a to 4 are perspective views illustrating a principle of implementing a vertical-type optical coupler or an optical splitter with the photonic-crystal plate according to the present invention. In the figures, dotted arrows indicate propagation of light in a wavelength range where entire path transfer occurs due to the presence of the photonic-crystal plate according to the present invention. Solid arrows indicate propagation of light in a wavelength range where partial path transfer occurs due to the presence of the photonic-crystal plate according to the present invention.

In FIGS. 2a to 4, the crystal lattice defect of the photonic lattice plate includes a main crystal lattice defect forming a main waveguide to one of the light-receiving device and the light-emitting device in the optical fiber, and a neighboring crystal lattice defect optically coupled with the main waveguide and forming a sub-waveguide to the other of the light-receiving device and light-emitting device.

As shown, optical fibers (or external optical waveguides) are coupled at points through which the arrows pass on an upper surface of the photonic lattice plate, and optical devices (a light-emitting device or a light-receiving device) are located at points through which the arrows pass on a lower surface of the photonic-crystal plate. Preferably, the light-emitting device is a surface-emitting light source device, and the light-receiving device is a surface-receiving light detector.

Here, the photonic-crystal plate has a thickness determined from a wavelength at which optical coupling occurs. The thickness corresponds to a coupling length (or an integer multiple of the coupling length) of a waveguide from which intensity of light entirely transfers to neighboring waveguides. The optical coupling with the wavelength for the photonic-crystal plate having a constant thickness is shown in FIG. 2c. It is possible to achieve entire optical coupling with neighboring waveguides for a specific wavelength and to select wavelengths at which most light is not coupled. Also, the thickness of the photonic-crystal plate corresponding to a wavelength at which light coupling occurs tends to be smaller as a spacing between the neighboring optical waveguides is small and to be greater as a ratio d/Λ of a diameter d of the hole of the photonic-crystal plate to a distance Λ between the holes for a constant spacing is great. For the determined photonic-crystal plate, the coupling length is smaller according to an increasing wavelength of light. These can be obtained by a vector finite element method.

Figure 2A:
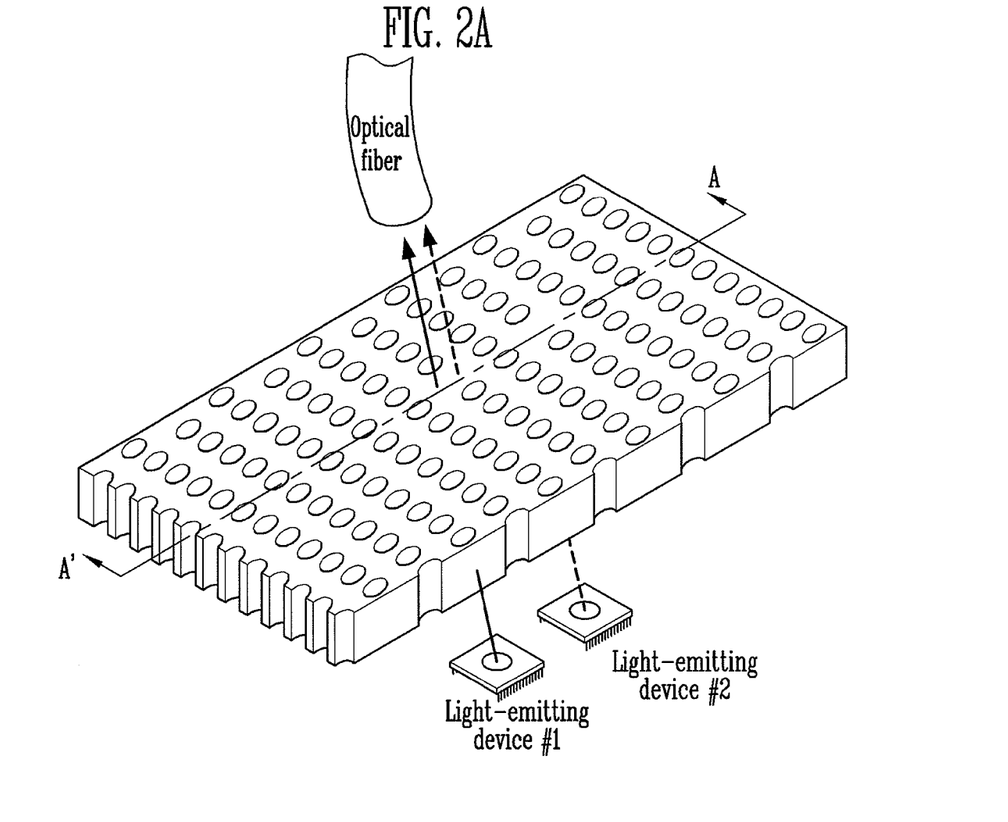
FIGS. 2a and 2b are perspective and cross-sectional views illustrating a principle of implementing a vertical-type optical coupler with the photonic-crystal plate according to an exemplary embodiment of the present invention.
Figure 2B:
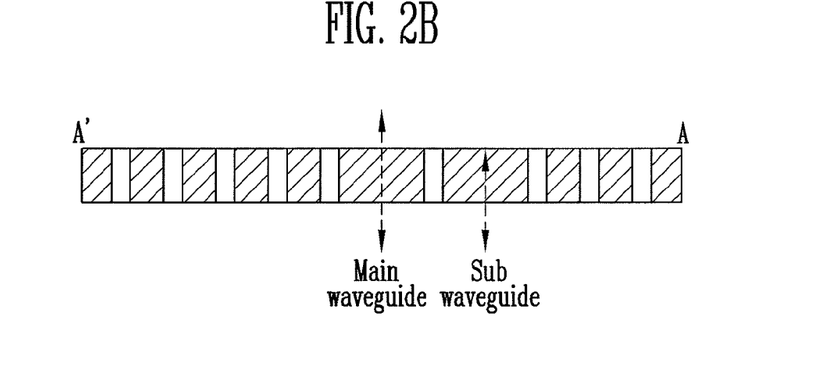
Figure 2C:
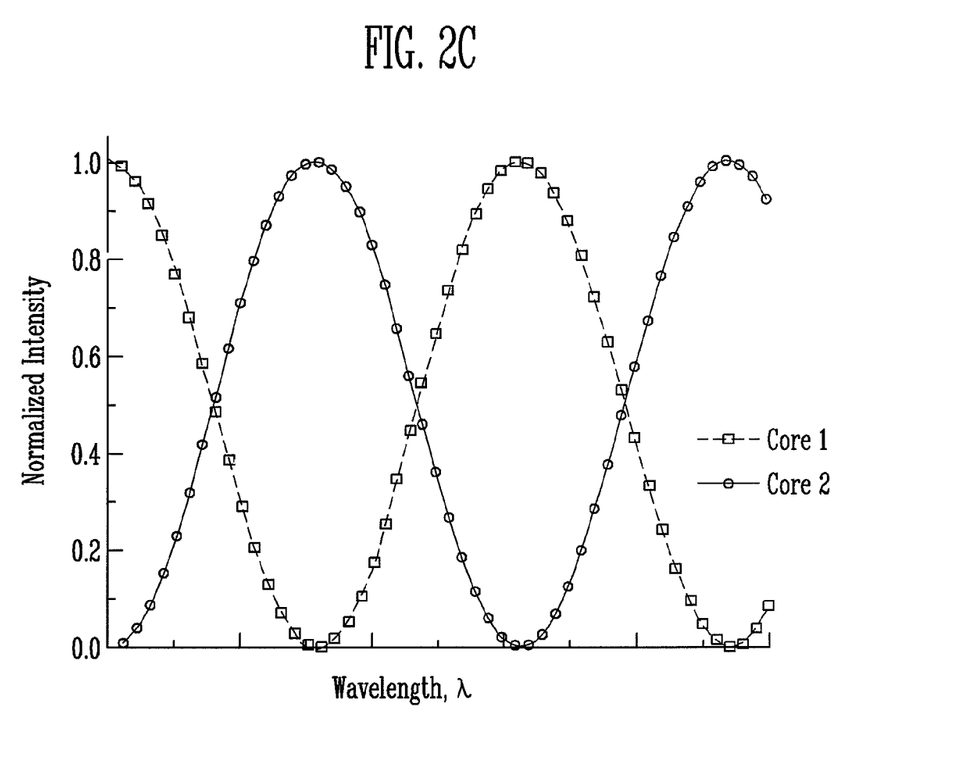
FIG. 2c is a graph illustrating intensity of light that can be obtained at respective optical waveguides with a wavelength for a determined thickness of a photonic-crystal plate.

FIGS. 2a and 2b show a principle of implementing a vertical-type optical coupler. When two lights having greatly different wavelengths are input to one vertical-type optical waveguide (a main waveguide) of a photonic-crystal plate having a thickness corresponding to a coupling length for a specific wavelength, the light having a specific wavelength propagates by the coupling length through the vertical-type optical waveguide, such that intensity of the light entirely transfers to the neighboring optical waveguides (sub-waveguides) to cause optical coupling, and the light having the different wavelength mostly propagates through the vertical-type optical waveguide (main waveguide) and is output to the other side of the plate.

Figure 3:
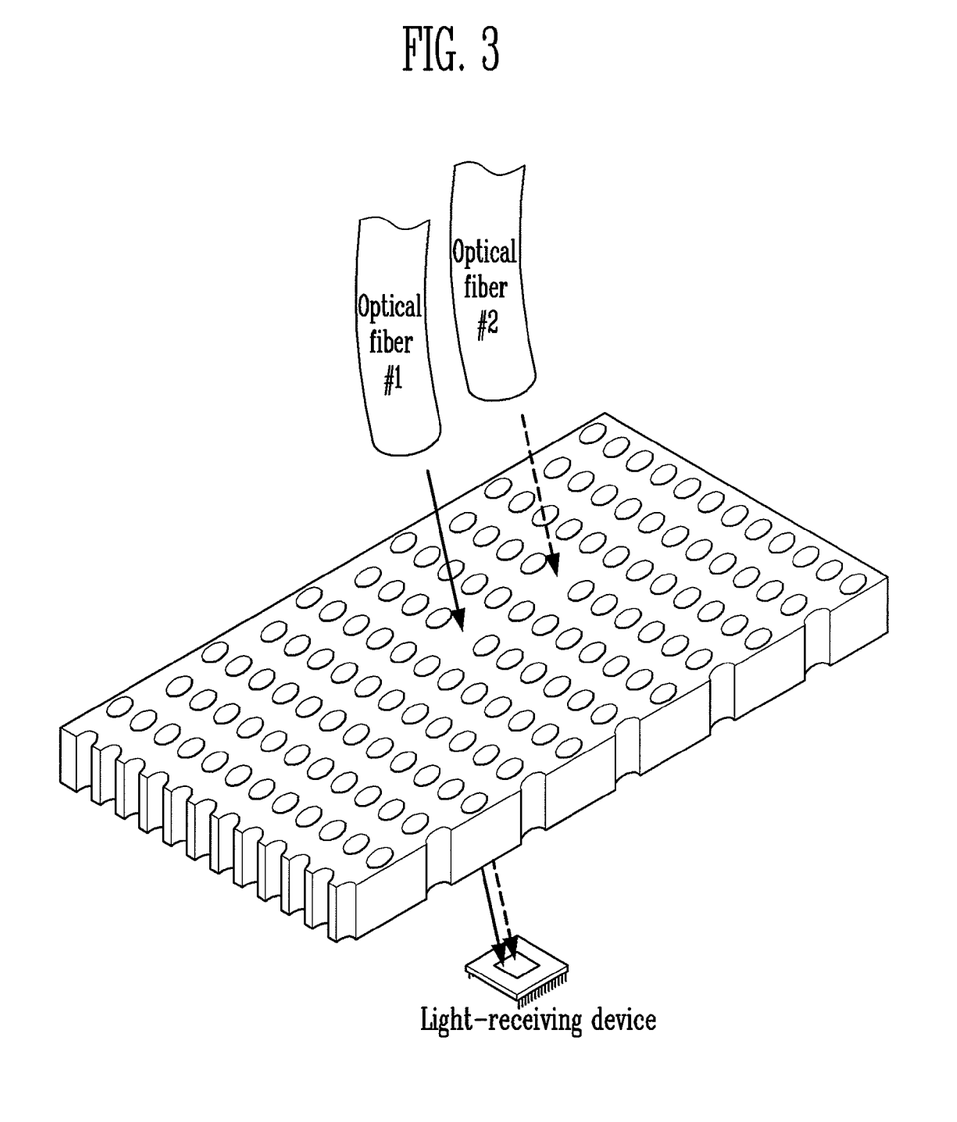
FIG. 3 is a perspective view illustrating a principle of implementing another vertical-type optical coupler with the photonic-crystal plate according to an exemplary embodiment of the present invention.

The photonic-crystal plate of FIG. 3 has substantially the same role as that of FIG. 2a and in FIG. 3, wherein the light propagates from up to down. In FIG. 2a, the lights are input from two light-emitting devices located at the lower surface of the photonic-crystal plate, and coupled and mixed on one path according to their wavelength by the photonic-crystal plate, such that the resultant light is connected to one optical fiber at the upper surface of the photonic-crystal plate. On the other hand, in FIG. 3, lights are input through two optical fibers (or external optical waveguides) connected to the upper surface of the photonic-crystal plate, and coupled and mixed on one path according to their wavelength by the photonic-crystal plate, such that the resultant light is detected by one light-receiving device at the lower surface of the photonic-crystal plate.

Figure 4:
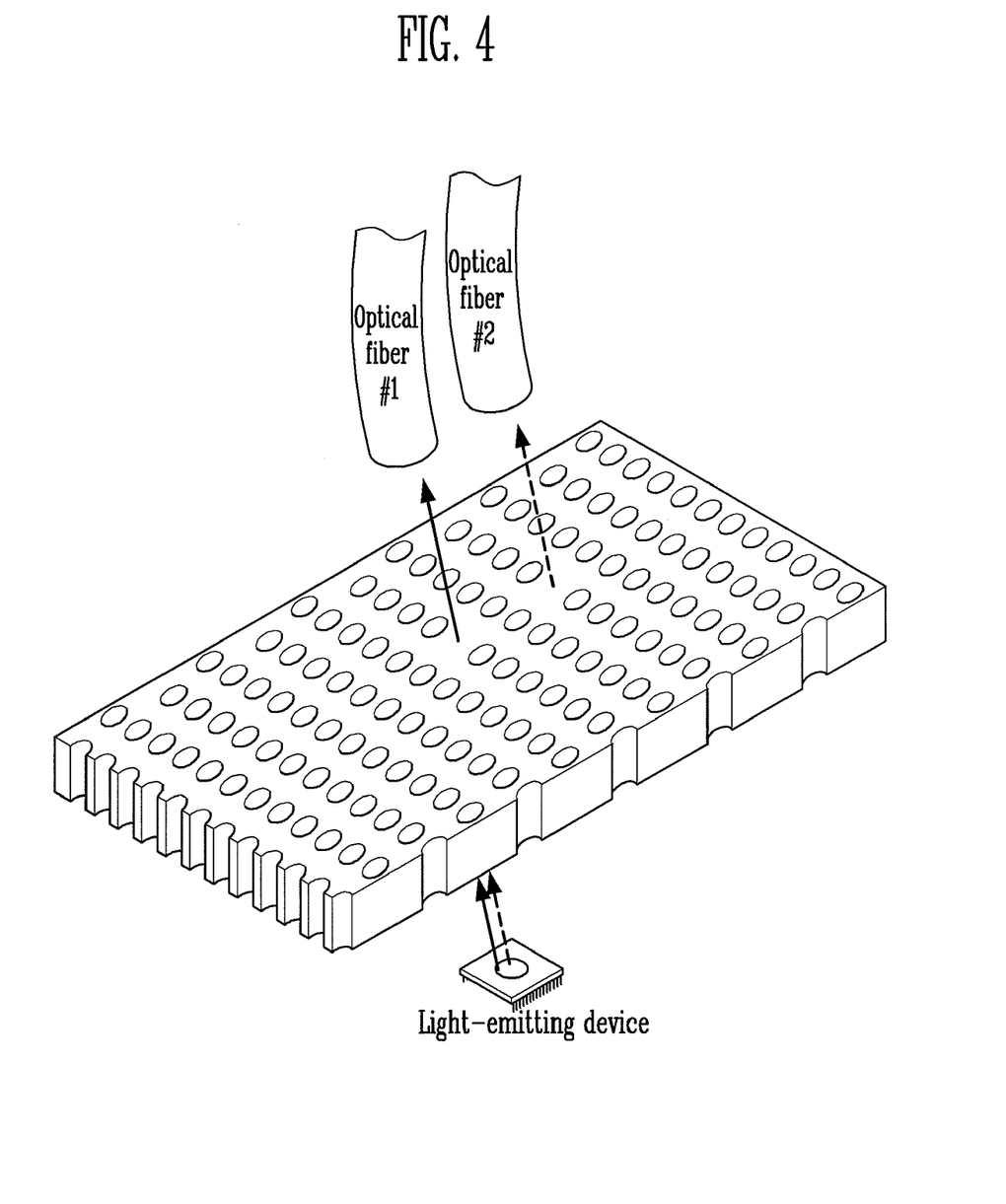
FIG. 4 is a perspective view illustrating a principle of implementing another vertical-type optical splitter with the photonic-crystal plate according to an exemplary embodiment of the present invention.

FIG. 4 is a perspective view illustrating a principle of implementing a vertical-type optical splitter with the photonic-crystal plate according to the present invention. Referring to the perspective view of the vertical-type optical coupler shown, when two lights having a different wavelength are input from an opposite side of the photonic-crystal plate having a thickness corresponding to a coupling length to different vertical-type waveguides, the light on the vertical-type waveguide having a thickness corresponding to the coupling length entirely transfers to neighboring waveguides (the sub-waveguides) while the other light is mostly left in the original optical waveguide (the main waveguide). Thus, light emitted from one light-emitting device (or two nearby light-emitting devices) can be split into two paths according to its wavelength band and output to the exterior via respective optical fibers (or external optical waveguides).

Figure 5:
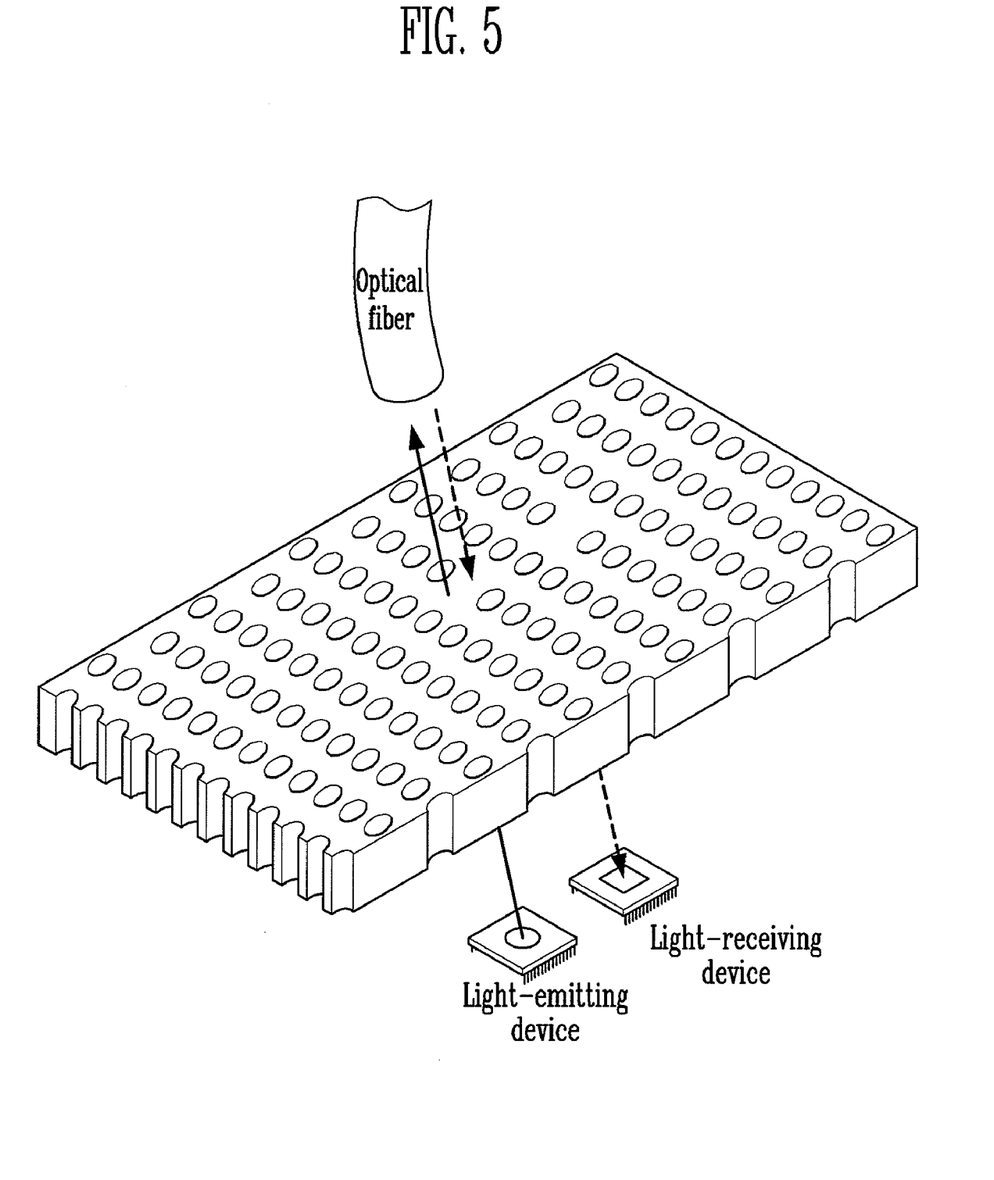
FIG. 5 is a perspective view illustrating a principle of implementing a vertical-type bi-directional optical device with the photonic-crystal plate according to an exemplary embodiment of the present invention.

FIG. 5 is a perspective view illustrating a vertical-type bi-directional optical device that allows lights having different wavelengths to be input from both sides of any one vertical-type optical waveguide of a photonic-crystal plate having a thickness corresponding to a coupling length according to the present invention. As shown in FIG. 5, one of the lights on the vertical-type waveguide having a thickness corresponding to the coupling length entirely transfers to the neighboring waveguide (the main waveguide) and the other light is mostly left on the original optical waveguide (sub-waveguide).

The photonic-crystal plate having the vertical-type optical waveguides as shown in FIG. 5 may be integrated with a surface-emitting light source device and a surface-receiving light detector device. The light from the light source is connected and output to the optical fiber through the vertical-type optical waveguide, and the lights input through the same fiber are input to the surface receiving light detector along a light path changed by the vertical-type optical coupler.

Thus, it can be seen that the present invention can be applied as a bi-directional module in which the surface-emitting light source device and the surface-receiving light detector device transmit and receive light through one optical fiber via the photonic-crystal plate comprising the vertical-type optical waveguides shown.

Although the bi-directional optical device of FIG. 5 has been implemented so that the input lights are caused to be coupled, the transmitted lights may be caused to be coupled.

Figure 6A:
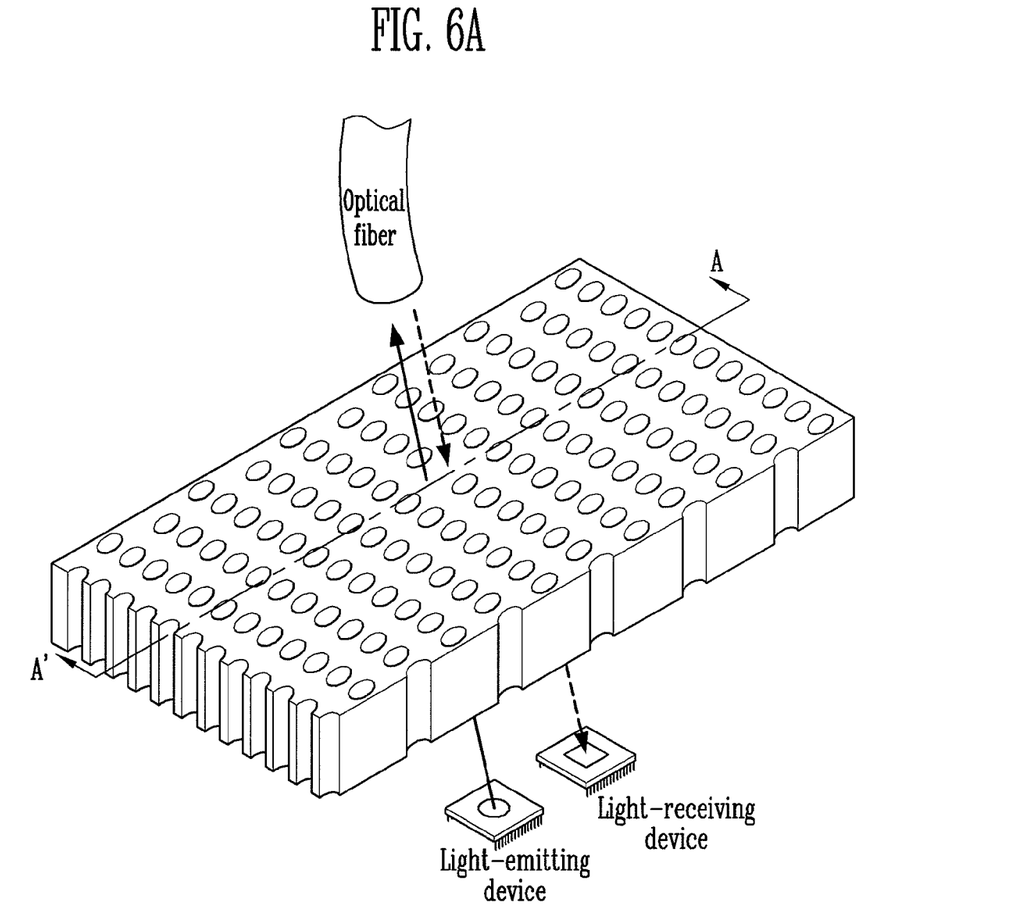
FIGS. 6a and 6b are perspective and cross-sectional views illustrating a principle of implementing a vertical-type bi-directional optical device with the photonic-crystal plate according to another exemplary embodiment of the present invention.
Figure 6B:
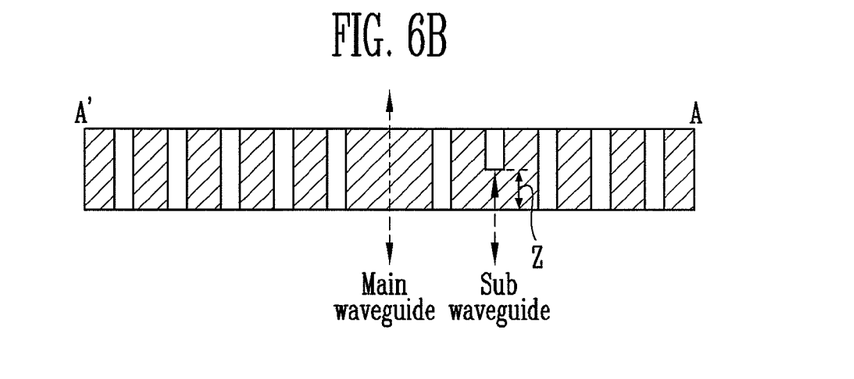

FIGS. 6a and 6b illustrate a structure of a waveguide of a photonic-crystal plate having a greater thickness, in which the photonic-crystal plate having a greater thickness is used to implement the vertical-type bi-directional optical device of FIG. 5. In the bi-directional optical device shown, when lights having different wavelengths are input from both sides of the vertical-type optical waveguide, one of the lights on the vertical-type waveguide having a thickness corresponding to a coupling length entirely transfers to the neighboring waveguide (the main waveguide) and the other light is mostly left on the original optical waveguide (the sub-waveguide), as in FIG. 5.

In FIGS. 6a and 6b, the neighboring vertical-type optical waveguide (the sub-waveguide) is formed with a length (Z) corresponding to a coupling length for a specific wavelength at which optical coupling occurs. The other light having a different wavelength is mostly left on the original optical waveguide (the main waveguide) while propagating through the vertical-type optical waveguide since the neighboring optical waveguide (the sub-waveguide) does not extend to the other side of the plate, thereby efficiently preventing light indicated by a solid line from transferring to the neighboring optical waveguide (the sub-waveguide). That is, the use of the photonic-crystal plate having the structure of FIG. 6b effectively prevents light having a wavelength intended to pass through the main waveguide from unintentionally leaking to the sub-waveguide, unlike the photonic-crystal plate having the structure of FIG. 2b.

The length (Z) of the sub-waveguide is determined from a wavelength at which optical coupling is intended to occur and corresponds to a coupling length (or an integer multiple of the coupling length) of a waveguide from which intensity of light entirely transfers to the neighboring waveguides. For example, in a photonic-crystal plate formed of a silica material and having a triangular lattice, when a ratio d/Λ of a diameter of the hole to a distance between the holes is 0.5 and a wavelength of light is 1.55 µm, the coupling length for a spacing between the nearest optical waveguides is about 110 µm.

Although not shown, one or both of the upper and lower surfaces of the photonic-crystal plate may be anti-reflective coated so that the light is well coupled to the vertical-type optical waveguides of the photonic-crystal plate.

Figure 7:
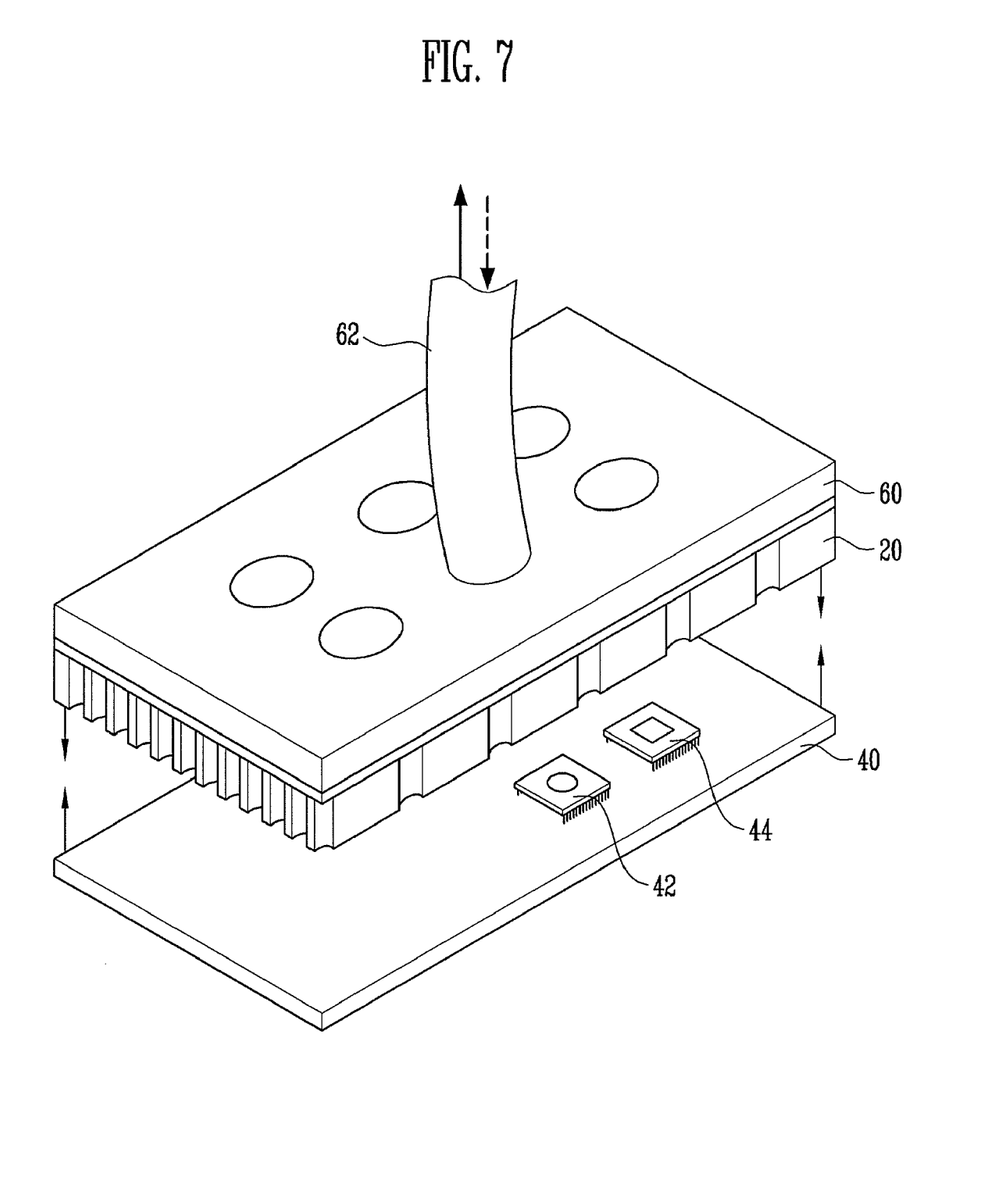
FIG. 7 is a perspective view illustrating a structure of an optical device assembly implemented by a vertical-type photonic-crystal plate according to an exemplary embodiment of the present invention.

FIG. 7 shows an optical device assembly in which the photonic-crystal plate (serving as the vertical-type optical waveguide, the vertical-type optical coupler, the vertical-type optical splitter, or the vertical-type bi-directional optical device) according to the present invention is aligned with an optical fiber, and optical devices (a light-emitting device or a light-receiving device) are located below the photonic-crystal plate.

The optical device assembly shown includes: a substrate 40 having at least one optical device implemented thereon; a photonic lattice plate 20 placed over the substrate 40, having a photonic crystal lattice structure in which a plurality of cylindrical through holes are formed in a thickness direction and arranged in a periodic crystal lattice structure, and including at least one crystal lattice defect; and an optical fiber 62 having a section contiguous to a top of the crystal lattice defect of the photonic-crystal plate 20. Here, a light-receiving path or a light-emitting path for the optical device is formed perpendicular to the photonic-crystal plate 20 below the crystal lattice defects of the photonic-crystal plate 20.

Since the optical device assembly shown is implemented by the bi-directional optical device of FIG. 5 or 6a, light input from the optical fiber 62 is subjected to optical coupling, transferred to the sub-waveguide, and then input to the light-receiving device 44. Light emitted from the light-emitting device 42 is output to the optical fiber 62 via the main waveguide. That is, the fiber 62 shown is implemented to simultaneously pass the output light and the input light.

Figure 8:
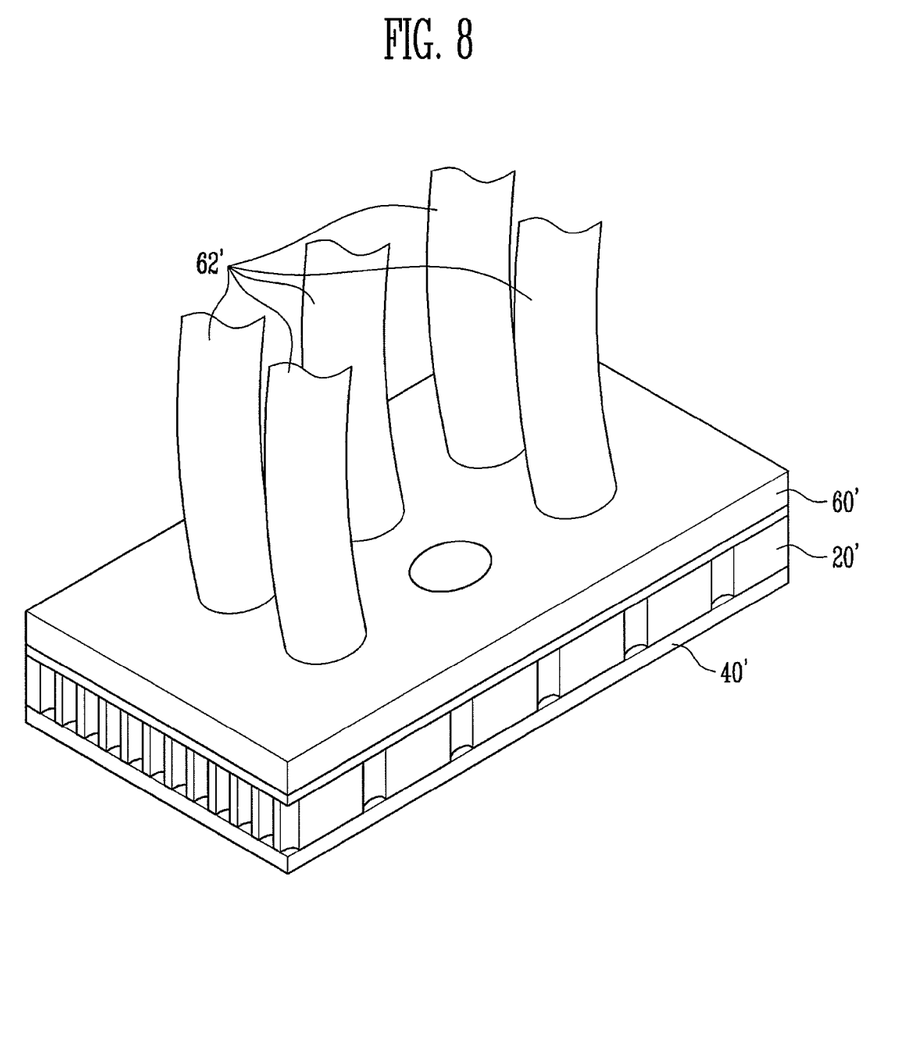
FIG. 8 is a perspective view illustrating optical devices and optical fibers of the optical device assembly of FIG. 7 arranged in a two-dimensional matrix.

It is advantageous in manufacturing cost and volume of the optical module to arrange a plurality of optical devices and a plurality of optical fibers, compared to arrangement of one optical device on the substrate 40' and connection to one optical fiber. As shown in FIG. 8, optical fibers 62' and optical devices of the optical device assembly are arranged in a two-dimensional matrix.

In this case, a light-receiving device for detecting external light input through the optical fiber, and a light-emitting device for generating light to be output to the exterior through the optical fiber may be mounted on the substrate 40'. The light-receiving device may detect the external input light and the light-emitting device may generate light obtained from suitable operation and/or processing performed based on the detection result and output the generated light to the exterior. That is, although not shown, surface-emitting light source devices and/or surface-receiving light detector devices integrated with the vertical-type optical waveguide or the vertical-type optical coupler are arranged in a matrix between the substrate 40' and the photonic-crystal plate 20' of FIG. 8.

Figure 9:
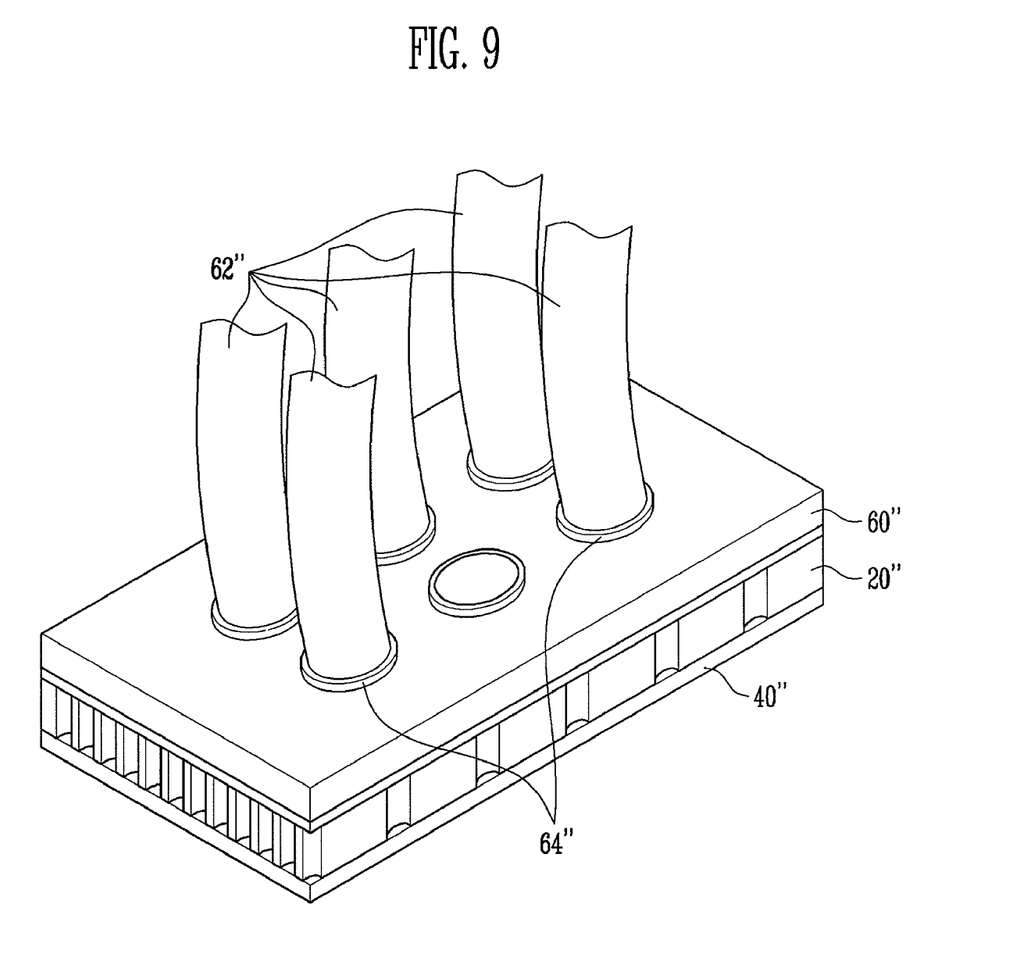
FIG. 9 is a perspective view illustrating a guide for allowing optical fibers to be easily inserted into the optical device assembly of FIG. 8.

In another implementation as shown in FIG. 9, a coupling layer 60" may be further formed on an upper surface of the photonic-crystal plate 20" and have guides 64" for fixing the optical fibers 62" to at least one crystal lattice defect. The guides 64" allow the fibers to be easily inserted and coupled into the crystal lattice defects.

In the present invention, light is input in a direction perpendicular to the plate, propagated through the vertical-type optical waveguide, and output to the other side of the plate. Also, vertical-type coupling is achieved. That is, light having a specific wavelength transfers to the neighboring optical waveguide formed to a depth corresponding to a coupling length for the specific wavelength.

Accordingly, light can be connected to surface-emitting light sources/light detectors for optical communication in consideration of their planarity, and the surface-emitting light sources and surface-emitting light detectors can be arranged in a matrix for high integration.

According to the present invention, the vertical-type optical waveguide and the vertical-type optical coupler can be easily integrated with a surface-emitting light source(s) and a surface-receiving light detector(s), and can be applied to a bi-directional module in which they are connected with one optical fiber for light transmission and reception.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A photonic-crystal plate including a plurality of cylindrical through holes formed in a thickness direction and arranged in a periodic crystal lattice structure, the photonic-crystal plate comprising:
    a main crystal lattice defect that forms a main optical waveguide for receiving and passing lights in a direction perpendicular to the photonic-crystal plate; and
    a sub-crystal lattice defect that forms a sub-optical waveguide for causing light in a specific wavelength band among the lights being received and passing through the main optical waveguide in the direction perpendicular to the photonic-crystal plate to be optically coupled and passing the coupled light in the direction perpendicular to the photonic-crystal plate,
    wherein the main optical waveguide is placed closer to the sub-optical waveguide.

2. The plate of claim 1, wherein the cylindrical through holes lack a material for forming the photonic-crystal plate.

3. The plate of claim 1, wherein the cylindrical through holes are filled with a different optical material from the photonic-crystal plate material.

4. The plate of claim 1, wherein the photonic-crystal plate has a thickness corresponding to a coupling length in a wavelength band of light at which optical coupling is intended to occur.

5. The plate of claim 1, wherein the sub-crystal lattice defect is formed from one surface of the photonic-crystal plate to a predetermined depth.

6. The plate of claim 5, wherein the predetermined depth corresponds to a coupling length in a wavelength band of light at which optical coupling is intended to occur.

7. An optical waveguide device comprising:
    a photonic-crystal plate including a plurality of cylindrical through holes formed in a thickness direction and arranged in a periodic crystal lattice structure, and at least one crystal lattice defect;
    a light input unit for inputting light to the at least one crystal lattice defect in a direction perpendicular to the photonic-crystal plate; and
    a light output unit for receiving and collecting the light emitted from the at least one crystal lattice defect in a direction perpendicular to the photonic-crystal plate,
    wherein the photonic-crystal plate comprising:
        a main crystal lattice defect that forms a main optical waveguide for receiving and passing lights in a direction perpendicular to the photonic-crystal plate; and
        a sub-crystal lattice defect that forms a sub-optical waveguide for causing light in a specific wavelength band among the lights being received and passing through the main optical waveguide in the direction perpendicular to the photonic-crystal plate to be optically coupled and passing the coupled light an the direction perpendicular to the photonic-crystal plate,
        wherein the main optical waveguide is placed closer to the sub-optical waveguide.

8. The device of claim 7, wherein the light input unit comprises an optical fiber having a section contiguous to the at least one crystal lattice defect.

9. The device of claim 7, wherein the light output unit comprises an optical fiber having a section contiguous to the at least one crystal lattice defect.

10. The device of claim 7, wherein the light input unit comprises a light-emitting device for emitting light to the at least one crystal lattice defect.

11. The device of claim 7, wherein the light output unit comprises a light-receiving device for receiving light from the at least one crystal lattice defect.

12. An optical device assembly comprising:
- a substrate having at least one optical device implemented thereon;
- a photonic-crystal plate disposed over the substrate and having a photonic crystal lattice structure in which a plurality of cylindrical through holes are formed in a thickness direction and arranged in a periodic crystal lattice structure, the photonic-crystal plate including at least one crystal lattice defect; and
- an optical fiber having a section contiguous to a top of the at least one crystal lattice defect of the photonic-crystal plate,
- wherein a light-receiving path or a light-emitting path for the optical device is established vertically below the at least one crystal lattice defect of the photonic-crystal plate,
- wherein the photonic-crystal elate comprising:
  - a main crystal lattice defect that forms a main optical waveguide for receiving and passing lights in a direction perpendicular to the photonic-crystal plate; and
  - a sub-crystal lattice defect that forms a sub-optical waveguide for causing light in a specific wavelength band among the lights being received and passing through the main optical waveguide in the direction perpendicular to the photonic-crystal plate to be optically coupled and passing the coupled light in the direction perpendicular to the photonic-crystal plate,
  - wherein the main optical waveguide is placed closer to the sub-optical waveguide.

13. The assembly of claim 12, further comprising a coupling layer formed on an upper surface of the photonic-crystal plate for fixing the optical fiber to the top of the at least one crystal lattice defect.

14. The assembly of claim 12, wherein the substrate comprises:
- a light-receiving device for detecting light input from the exterior through the optical fiber; and
- a light-emitting device for generating light to be output to the exterior through the optical fiber.

15. The assembly of claim 14, wherein the optical fiber simultaneously passes the light to be output to the exterior and the light input from the exterior.

16. The assembly of claim 12, wherein the optical devices and the optical fibers are arranged in a two-dimensional matrix.

* * * * *